US012651989B2

(12) United States Patent
Aizawa et al.

(10) Patent No.: US 12,651,989 B2
(45) Date of Patent: Jun. 9, 2026

(54) MOTOR DRIVE DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Toshimitsu Aizawa, Tokyo (JP); Takeshi Shibayama, Tokyo (JP); Tetsuro Iwamura, Tokyo (JP); Makoto Shinohara, Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 217 days.

(21) Appl. No.: 18/598,130

(22) Filed: Mar. 7, 2024

(65) Prior Publication Data

US 2025/0030364 A1 Jan. 23, 2025

(30) Foreign Application Priority Data

Jul. 20, 2023 (JP) ................................. 2023-118313

(51) Int. Cl.
*H02P 21/14* (2016.01)
*H02P 21/22* (2016.01)
(Continued)

(52) U.S. Cl.
CPC .............. *H02P 21/24* (2016.02); *H02P 21/22* (2016.02); *H02P 25/03* (2016.02); *H02P 27/08* (2013.01)

(58) Field of Classification Search
CPC .......... H02P 21/24; H02P 21/22; H02P 27/08; H02P 21/14; B28D 1/14; B25B 21/00
See application file for complete search history.

(56) References Cited

U.S. PATENT DOCUMENTS

| | | | | | |
|---|---|---|---|---|---|
| 5,952,810 | A | * | 9/1999 | Yamada | H02P 6/20 |
| | | | | | 318/700 |
| 2008/0042614 | A1 | * | 2/2008 | Oomura | H02P 21/14 |
| | | | | | 318/807 |

(Continued)

FOREIGN PATENT DOCUMENTS

| | | |
|---|---|---|
| JP | 2004-72906 A | 3/2004 |
| JP | 2007-89322 A | 4/2007 |

*Primary Examiner* — Cortez M Cook
(74) *Attorney, Agent, or Firm* — Oblon, McClelland, Maier & Neustadt, L.L.P.

(57) ABSTRACT

An embodiment provides a motor drive device including: a power conversion circuit having a configuration in which a plurality of arms including a series circuit of positive and negative semiconductor switching elements are connected in parallel to each other and configured to drive a motor; a controller configured to generate and output on/off signals for each of the semiconductor switching elements constituting the power conversion circuit by PWM control; a current detection unit configured to detect a current flowing through the power conversion circuit; a current limit unit configured to stop an operation of the controller when the current reaches a threshold; and a position estimation unit configured to estimate a rotational position of the motor using a motor current and a motor voltage, the position estimation unit being configured to correct the motor voltage used for estimation of the rotational position in a carrier cycle of the PWM control in which the operation of the controller is stopped.

9 Claims, 13 Drawing Sheets

(51) Int. Cl.
    *H02P 21/24*        (2016.01)
    *H02P 25/03*        (2016.01)
    *H02P 27/08*        (2006.01)

(56)             References Cited

U.S. PATENT DOCUMENTS

2013/0068491 A1*   3/2013   Kusakawa  .............. B25B 21/00
                                     173/176
2021/0205974 A1*   7/2021   Hashimoto  .............. B28D 1/14

* cited by examiner

BASIC CARRIER

PWM CARRIER

CURRENT LIMIT THRESHOLD

DETECTION CURRENT
(IMAGE)

U-PHASE GATE SIGNAL

V-PHASE GATE SIGNAL

W-PHASE GATE SIGNAL

Ed>0⇒POSITION ESTIMATION IS PROGRESSING

Ed<0⇒POSITION ESTIMATION IS DELAYED

BASIC CARRIER

CURRENT LIMIT THRESHOLD

SHUNT OUTPUT

U-PHASE GATE SIGNAL

V-PHASE GATE SIGNAL

W-PHASE GATE SIGNAL

CURRENT DETECTION TIMING

CURRENT DETECTION
IS NOT IMPOSSIBLE

MOTOR DRIVE DEVICE

FIELD OF THE INVENTION

An embodiment of the present invention relates to a device for driving a motor.

DESCRIPTION OF THE RELATED ART

For example, a power conversion device for driving a three-phase brushless motor has a configuration in which half-bridge circuit for three phases are connected in parallel between positive and negative DC power supply lines. The half-bridge circuit includes a pair of semiconductor switching elements connected in series to each other between the DC power supply lines and free-wheeling diodes connected in antiparallel to the semiconductor switching elements, respectively. In the power conversion device having the above configuration, each of the semiconductor switching elements is driven by PWM (Pulse Width Modulation) control. Thus, a DC power supplied from the DC power supply line is converted into three-phase AC power, and a current is applied to coils of the motor.

For circuits that drive a brushless motor, a sensor drive using a position sensor has been proposed, particularly for uses that require starting torque. However, a motor drive device is demanded that controls a brushless motor without using a position sensor in order to reduce costs and make a size small.

For example, there is a method of detecting a rotational position using an electromotive voltage generated in motor coils, instead of detecting the rotational position of a motor with a magnetic-pole sensor such as a Hall element, and outputting a motor voltage based on the detection result. In 120-degree square-wave driving that outputs a square-wave voltage with a conductive electrical angle of 120 degrees for one phase, an electromotive voltage can be directly detected in a 60-degree section where the output stops. However, the 120-degree square-wave driving is inferior in terms of noise and vibration compared with 180-degree sinewave driving that outputs a sinewave voltage.

Generally, as disclosed in Japanese Patent Laid-Open No. 2004-72906, for example, there is a method of calculating an electromotive voltage based on a motor voltage equation and estimating a rotational position using the electromotive voltage, thereby driving a sine wave without using a position sensor.

Further, vector control is used as a method of controlling a brushless motor with high accuracy. Under the vector control, a three-phase AC current of a motor is converted into a DC q-axis current serving as a torque component and a DC d-axis current serving as a magnetic flux component, both the currents are finely controlled independently, whereby it is possible to achieve high efficiency and low-vibration operation and to expand the range of operation. Since it is necessary to detect a motor current to control the current, two or more current sensors are generally used. However, there is a case of using an inexpensive shunt resistor as a current sensor without using an expensive current transformer in order to reduce costs and make a size small, similarly to the position sensor. In order to further reduce costs of the system, a single-shunt current detection system is adopted in which the number of shunt resistors is reduced from three to one.

When excessive current flows through a brushless motor, malfunctions such as demagnetization of magnets of the brushless motor or damage to semiconductor switching elements may be caused. In order to limit the motor current, for example, as disclosed in Japanese Patent Laid-Open No. 2007-89332, a function is used that cuts off a gate signal when a voltage of a shunt resistor arranged on a ground line of an inverter is equal to or higher than a threshold.

However, since the gate signal is cut off at the time of current limit, the output voltage may fall below the command, and an accurate motor current may not also be detected when the motor current is detected depending on the gate signal. Under position estimation control in which a rotational position detector is not used to reduce costs of the motor system, since an output voltage command and a motor current are used, there is a concern that position estimation accuracy may deteriorate at the time of current limit.

DETAILED DESCRIPTION OF THE EMBODIMENT

A motor drive device is provided that can prevent estimation accuracy of a rotational position from decreasing during a current limit.

A motor drive device according to an embodiment includes: a power conversion circuit having a configuration in which a plurality of arms including a series circuit of positive and negative semiconductor switching elements are connected in parallel to each other and configured to drive a motor;

a controller configured to generate and output on/off signals for each of the semiconductor switching elements constituting the power conversion circuit by PWM control;

a current detection unit configured to detect a current flowing through the power conversion circuit;

a current limit unit configured to stop an operation of the controller when the current reaches a threshold; and a position estimation unit configured to estimate a rotational position of the motor using a motor current and a motor voltage, the position estimation unit being configured to correct the motor voltage used for estimation of the rotational position in a carrier cycle of the PWM control in which the operation of the controller is stopped.

Figure 1:
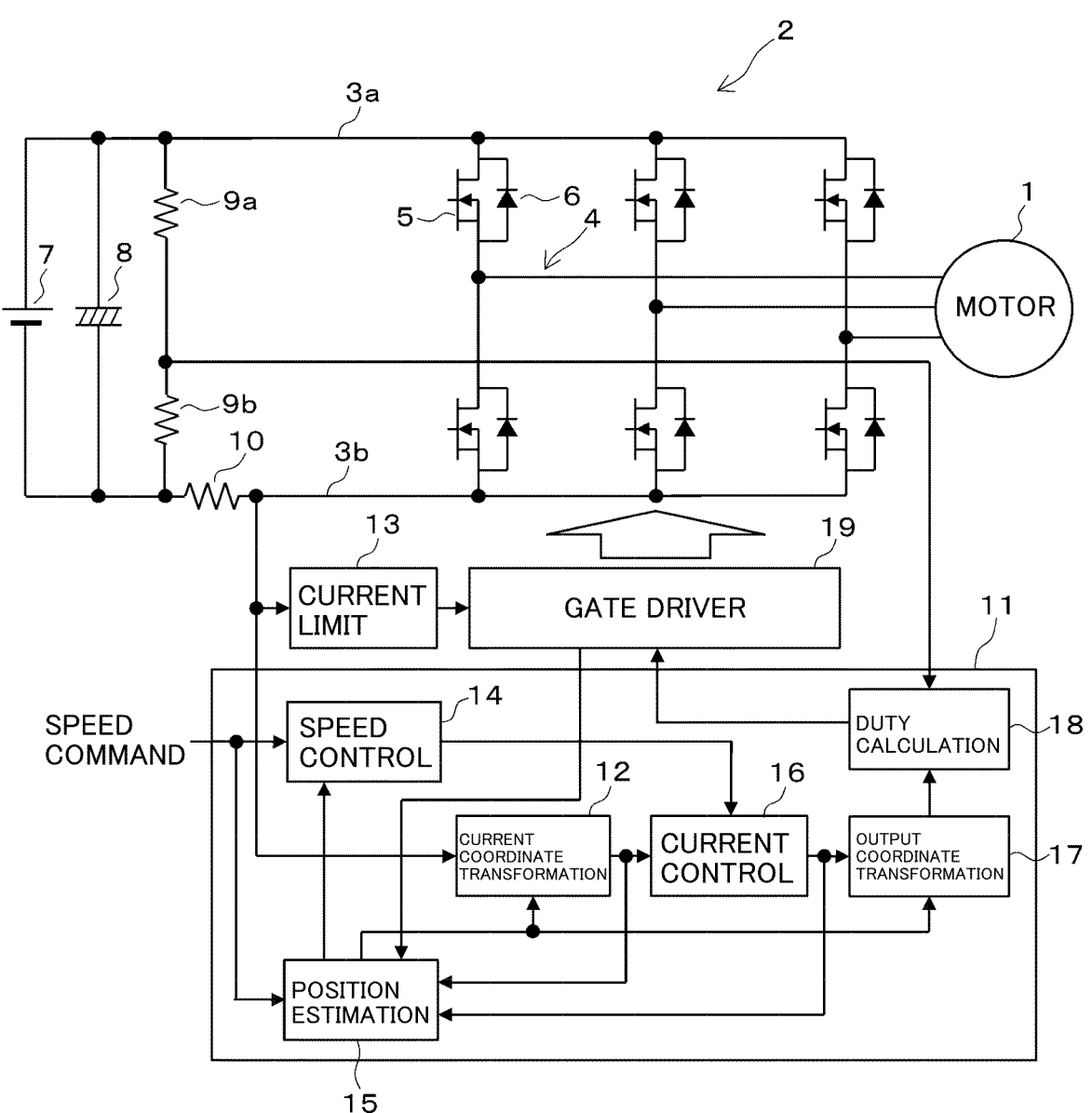
FIG. 1 is a diagram showing a configuration of a motor drive device according to an embodiment.

An embodiment will be described below. As shown in FIG. 1, a motor 1 is connected with an inverter 2, which is a power conversion device. The inverter 2 has a configuration in which half-bridge circuits 4 for three phases corresponding to an arm are connected in parallel between positive and negative DC power supply lines 3a and 3b. The half-bridge circuit 4 includes a pair of semiconductor switching elements 5 connected in series to each other between the DC power supply lines 3a and 3b and free-wheeling diodes 6 connected in antiparallel to the semiconductor switching elements 5, respectively. For example, when the semiconductor switching element is an N-channel MOSFET, the free-wheeling diode 6 serves as a parasitic diode.

A DC power supply 7, a smoothing capacitor 8, and a series circuit of resistor elements 9a and 9b are connected in parallel between the DC power supply lines 3a and 3b. A resistor element 10 serving as a current detection unit as is inserted between the resistor element 9b and the DC power supply line 3b. A so-called single-shunt current detection system is adopted to detect a motor current based on a terminal voltage of the resistor element 10. The motor current is converted into d- and q-axis currents on a rotational coordinate by a current coordinate transformation unit 12 of a controller 11. Further, a voltage detection point of the resistor element 10 is connected to an input terminal of a current limit unit 13.

A speed command is input to a speed control unit 14 and a position estimation unit 15 of the controller 11 from the outside. The speed control unit 14 corresponding to a command value determination unit performs PI (Proportional Integral) control on the speed command and a difference between estimated speeds calculated by the position estimation unit 15 to generate a q-axis current command.

The position estimation unit 15 calculates a d-axis electromotive voltage from motor parameters, d- and q-axis currents, and a d-axis voltage. PI control is performed such that the d-axis electromotive voltage becomes zero, and a speed is determined from the obtained result and the speed command. In addition, the speed is integrated to obtain an angle, and the angle is used in coordinate transformation. The d-axis current command is set to zero when field weakening control is not performed with a surface permanent magnet motor. A current control unit 16 performs PI control on differences between the d- and q-axis current commands and the d- and q-axis currents to generate d- and q-axis voltage commands.

An output coordinate transformation unit 17 performs coordinate transformation on the d- and q-axis voltage commands to generate three-phase voltage commands. A common connection point of the resistor elements 9a and 9b is connected to an input terminal of a duty calculation unit 18. The duty calculation unit 18 detects a divided voltage of the voltage supplied from the DC power supply 7, and calculates a duty value of each phase in PWM control from the three-phase voltage command and the power supply voltage. The duty value of each phase is input to a gate driver 19. The gate driver 19 generates and outputs, as a PWM signal, a gate signal to each of the semiconductor switching elements 5 constituting the inverter 2.

Figure 2:
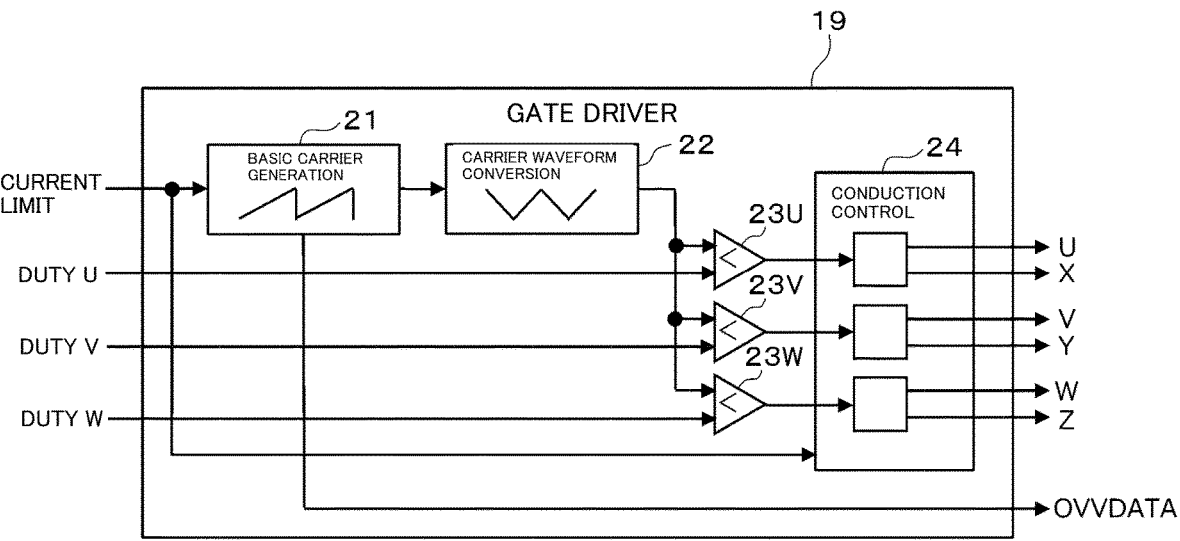
FIG. 2 is a diagram showing an internal configuration of a gate driver.
Figure 9:
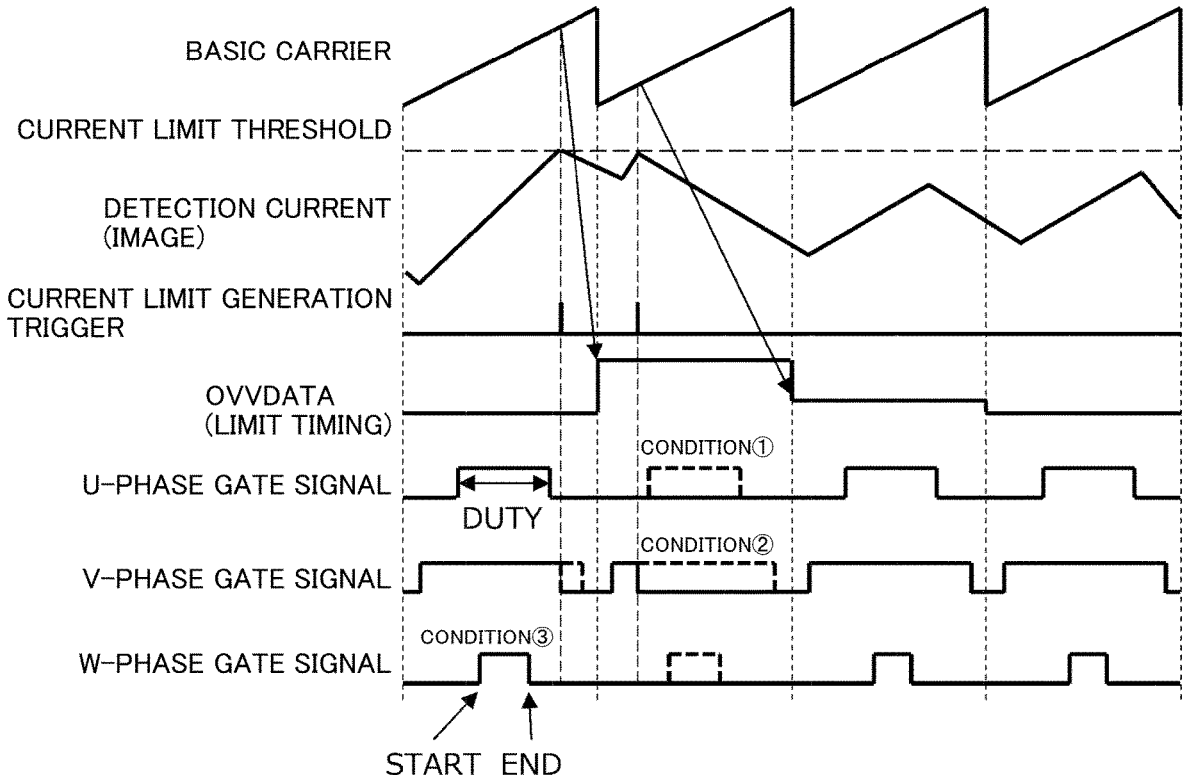
FIG. 9 is a diagram illustrating three conditions for correcting a d-axis voltage according to an occurrence timing of a current limit and an output timing of a gate signal for each phase.

The current limit unit 13 outputs a pulse-like current limit occurrence trigger when the terminal voltage of the resistor element 10 exceeds a current limit threshold (see FIG. 9). When the current limit occurrence trigger is input, the gate driver 19 cuts off the output of the gate signal from the timing until the end of one cycle of a PWM carrier, thereby preventing a large current from flowing through the motor 1. This state is often referred to as "current limit". As shown in FIG. 2, the gate driver 19 includes a basic carrier generation unit 21, a carrier waveform conversion unit 22, comparators 23U to 23W, and a conduction control unit 24.

Figure 3:
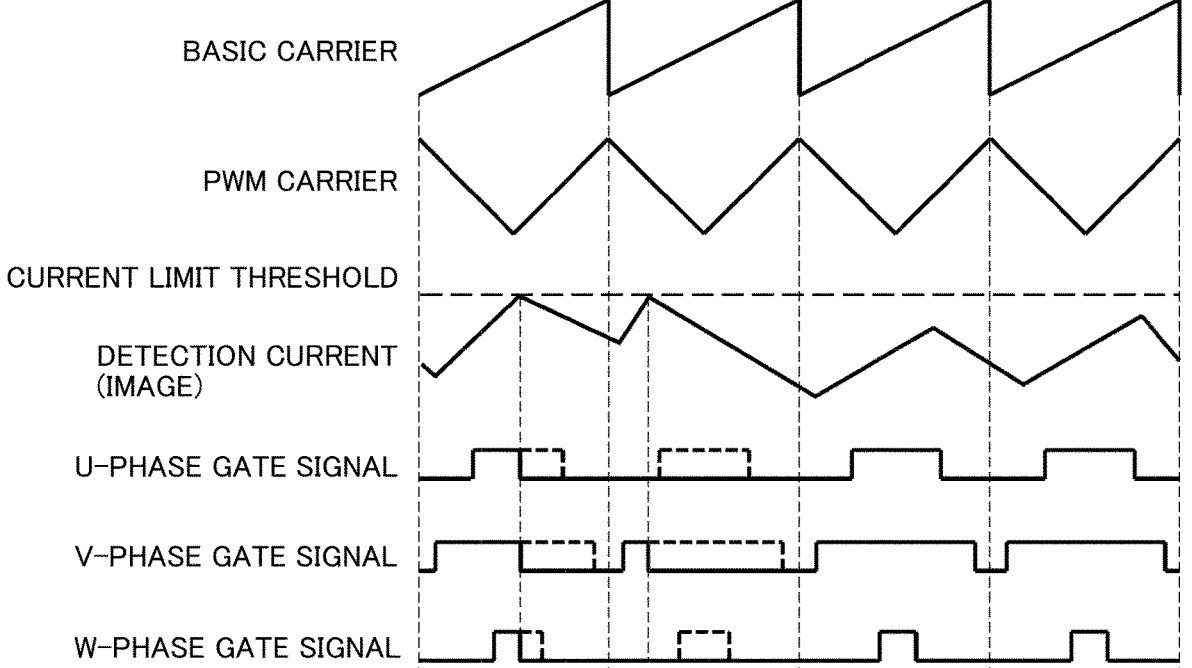
FIG. 3 is a diagram showing a carrier waveform in PWM control and an output waveform of a gate signal for each phase when a current limit occurs.

As shown in FIG. 3, the basic carrier generation unit 21 includes a carrier counter that monotonically increases, and generates a sawtooth wave as a basic carrier. The carrier waveform conversion unit 22 includes a carrier counter that performs subtraction in a first half of the cycle of the basic carrier and addition in a second half, and generates triangular waves as PWM carriers. A bottom of each of the triangular wave becomes a center point at which the PWM signal relative to each phase is generated. The comparators 23U to 23W compares PWM carrier waveform data and each phase duty, and outputs comparison results to the conduction control unit 24. In the conduction control unit 24, a dead time for short circuit prevention between the upper and lower semiconductor switching elements 5 is provided, and a gate signal to each of the semiconductor switching elements 5 is output as a PWM signal.

When a current limit trigger is input from the current limit unit 13, the conduction control unit 24 cuts off the output of the gate signal. The basic carrier generation unit 21 has a built-in data latch corresponding to a data retaining unit, retains as a limit timing OVVDATA, a count value the basic carrier at a time when the current limit trigger occurs, and outputs the limit timing to the outside. A method of using the OVVDATA will be described below. The detection current shown in FIG. 3 is an image, and is different from a voltage when the resistor element 10 detects a single-shunt current. That the gate signal is cut off in the middle of output means that the voltage according to the voltage command is not output.

Here, a basic formula for position estimation is represented.

$$Ed = Vd - R \cdot Id + \omega \cdot Lq \cdot Iq \qquad (1)$$

where, Ed: d-axis electromotive voltage, Vd: d-axis voltage, Id: d-axis current, Iq: q-axis current, R: coil resistor, ω: (angular) speed, and Lq: q-axis inductance.

Figure 4:
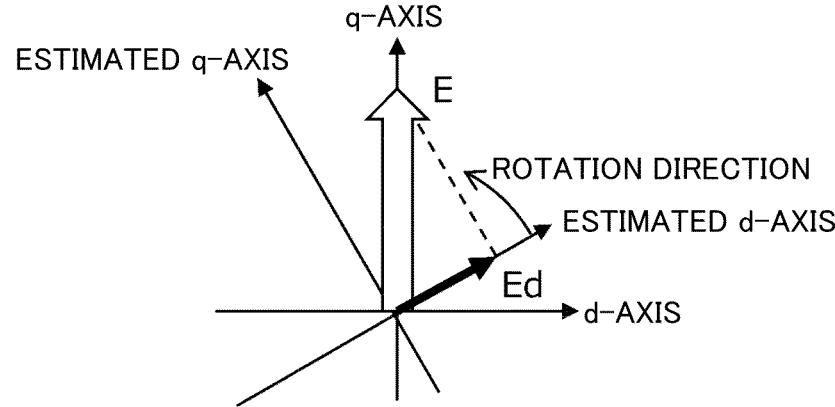
FIG. 4 is a diagram showing a relationship between a d-axis electromotive voltage Ed and an estimated axis during position estimation in a case of (Ed>0)
Figure 5:
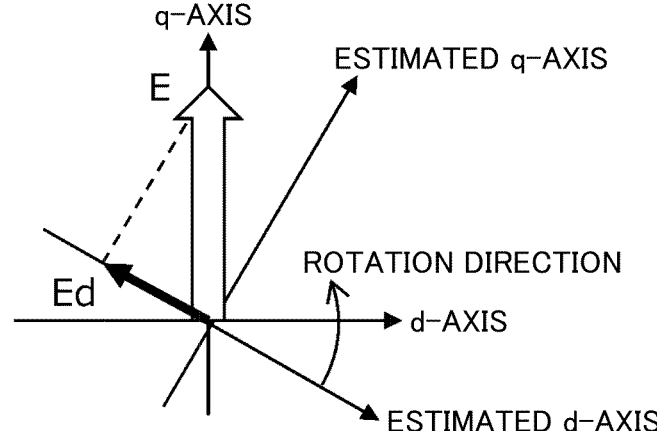
FIG. 5 is a diagram showing a relationship between a d-axis electromotive voltage Ed and an estimated axis during position estimation in a case of (Ed<0)

FIGS. 4 and 5 show a relationship between a d-axis electromotive voltage Ed and an estimated axis during position estimation. As shown in FIG. 4, when Ed>0, the estimated axis, that is, the position estimation is progressing with respect to the actual axis, and as shown in FIG. 5, when Ed<0, the position estimation is delayed.

Next, two problems at the time of current limit occurrence will be described. The first problem is that the voltage according to the voltage command is not output. Since there is a case where the output of the gate signal is cut off midway, it is considered that an amplitude of a d-axis voltage Vd becomes small. When the motor 1 is driven, normally Vd<0 and the d-axis electromotive voltage Ed increases, whereby it is expected that the position estimation position progresses.

Figure 6:
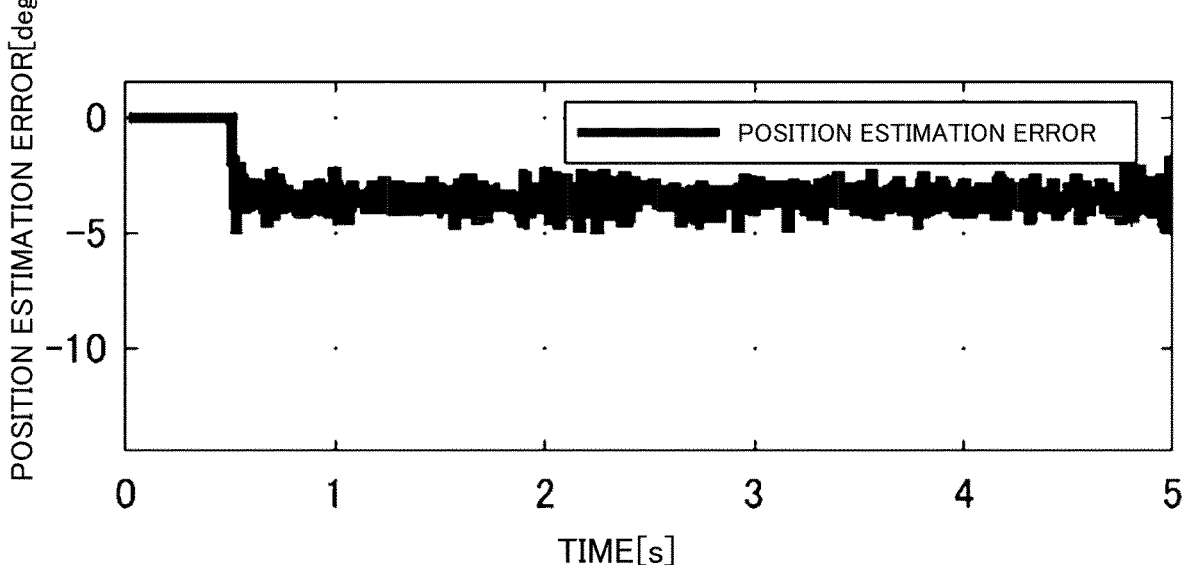
FIG. 6 is a diagram showing a simulation result of position estimation when there is no current limit.
Figure 7:
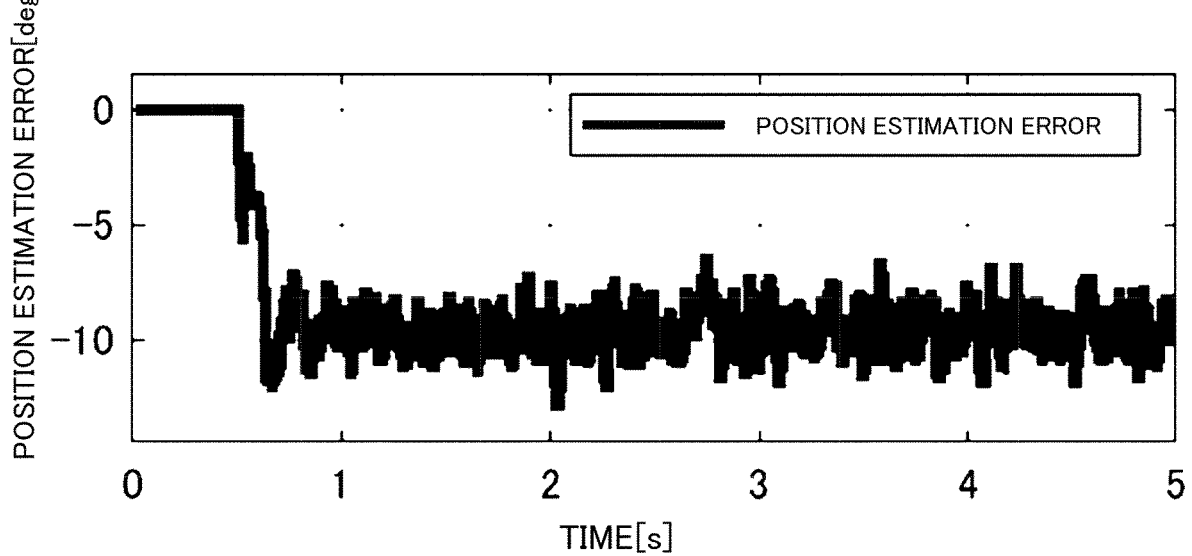
FIG. 7 is a diagram showing a simulation result of position estimation when there is a current limit.

FIGS. 6 and 7 show an influence on position estimation during a current limit due to simulation. FIG. 6 shows a position estimation error (=actual position-estimated position) when there is no current limit, and FIG. 7 shows a position estimation error when there is a current limit. The position estimation starts after 0.5 s. From this result, it can be confirmed that the position estimation progresses due to the current limit, and estimation accuracy decreases, consistent with the previous prediction.

Figure 8:
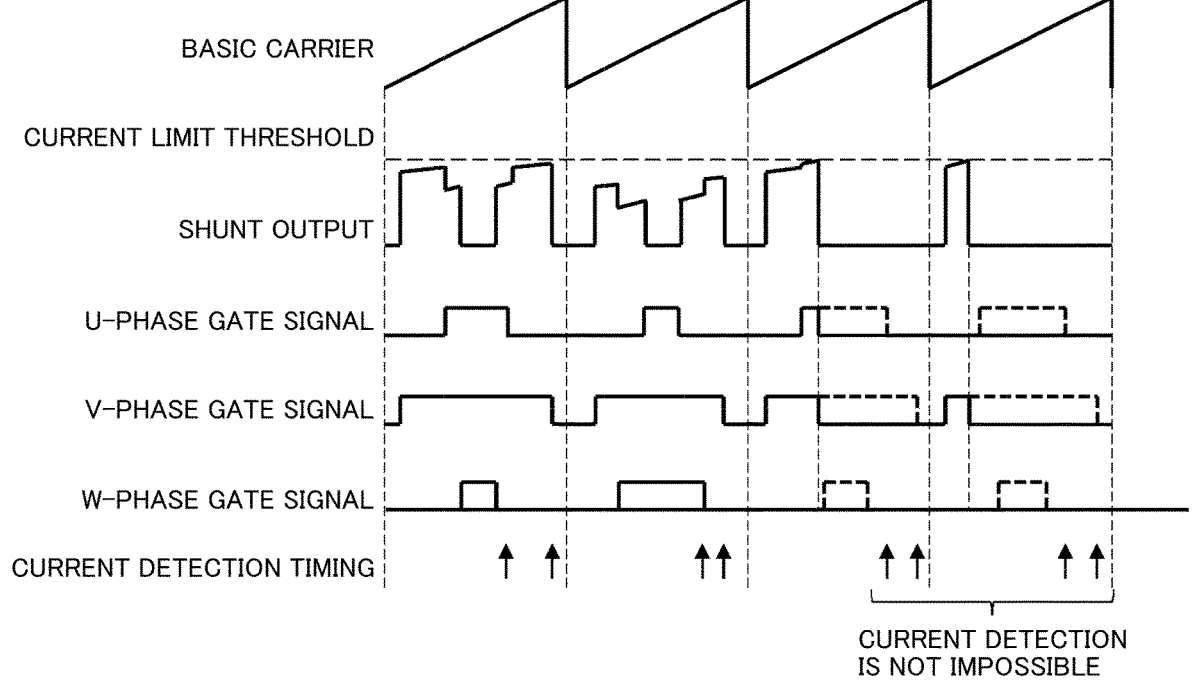
FIG. 8 is a diagram illustrating that a period occurs in which no current can be detected in a case of a single-shunt current detection system.

The second problem is that when the current limit occurs, the gate signal is cut off, and thus an accurate current cannot be detected in a single-shunt current detection system. FIG. 8 shows a gate signal and a current detection timing during current limit. In the single-shunt current detection system, when one or two gate signals are in an ON state, a current is detected at the high level timing. For this reason, when the gate signal is cut off due to the current limit, no current flows through the resistor element 10 and the terminal voltage becomes zero, whereby it is not possible to detect an accurate current.

Next, countermeasure methods against the two problems will be described. First, as the countermeasure against the first problem, a method of correcting the d-axis voltage used in position estimation based on the current limit occurrence timing will be described. As shown in FIG. 9, there are three conditions classified depending on the timing at which the gate signal is cut off, that is, a limit timing. Condition (1) is a case when the gate signal is cut off before being output, that is, when the gate signal is completely cut off, Condition (2) is a case when the gate signal is cut off while being output, and Condition (3) is a case when the gate signal is cut off after completion of output, that is, the gate signal is output as it is.

When the current limit occurrence trigger occurs, a count value of the basic carrier at that time is retained as limit timing data OVVDATA. The OVVDATA can be read in the next carrier cycle after the current limit occurs. A correction value for correcting the voltage of each phase is obtained as follows with respect to the above three conditions from the OVVDATA, a start timing START of a gate signal relative to each phase, an end timing END of a gate signal relative to each phase, and a duty of each phase.

when OVVDATA<START,correction value=0.   Condition (1):

when START<OVVDATA<END,correction value=
  (OVVDATA−START)/DUTY   Condition (2):

when END<OVVDATA,correction value=1   Condition (3):

In the drawings, Conditions (1) to (3) are indicated by circled numbers.

For example, when DUTY=0.75, the start timing START becomes 0.125 of the maximum value of the basic carrier. When the current limit occurrence trigger occurs at a timing of 0.75 of the carrier cycle, Condition (2) is satisfied, and the correction value is as follows:

$$0.833 = (0.75 - 0.125)/0.75.$$

The DUTY is corrected by the correction value, it becomes as follows:

$$0.75 \times 0.833 \approx 0.625.$$

Next, using the correction value of each phase, the d-axis correction voltage used in the position estimation is obtained as follows:

Each phase correction voltage =   (2)

each phase duty × each phase correction value × power supply voltage $\alpha$-axis correction voltage = {U-phase correction voltage-   (3)

(V-phase correction voltage + W-phase correction voltage)/2} × 2/3

$\beta$-axis correction voltage =   (4)

(V-phase correction voltage − W-phase correction voltage)/$\sqrt{3}$ d-axis correction voltage = $\alpha$-   (5)

axis correction voltage × COS$\theta$ + $\beta$-axis correction voltage × SIN$\theta$ For SIN$\theta$ and COS$\theta$, values used in the output coordinate transformation unit 17 can be used.

Figure 10:
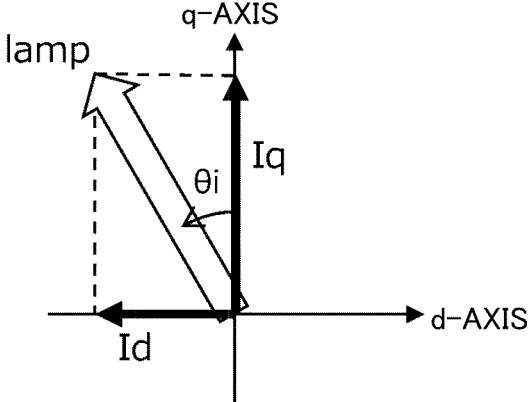
FIG. 10 is a diagram showing an example of a current on a d-q-axis coordinate when a current limit occurs.

Next, as the countermeasure against the second problem, a method of calculating the d- and q-axis currents used in the position estimation using the current limit value and the previous d- and q-axis currents will be described. As shown in FIG. 10, the occurrence of the current limit means that a motor current amplitude Iamp has reached the current limit value. Using the current value as the motor current amplitude, d- and q-axis current correction values used in the position estimation are obtained as follows.

d-axis current correction value =   (6)

−current limit value × SIN{current phase(previous value)} q-axis current correction value =   (7)

current limit value × COS{current phase(previous value)}

The current phase (previous value) is obtained from the following.

Current phase(previous value)=ATAN(d-axis current
    (previous value)/q-axis current(previous value))   (8)

Here, the current limit value and the previous d- and q-axis currents are used, a method can also be considered in which the d- and q-axis current correction values used in the position estimation are obtained using only the previous d- and q-axis currents, or the d- and q-axis current commands, the current limit value, the previous d- and q-axis currents, and the limit timing.

Figure 11:
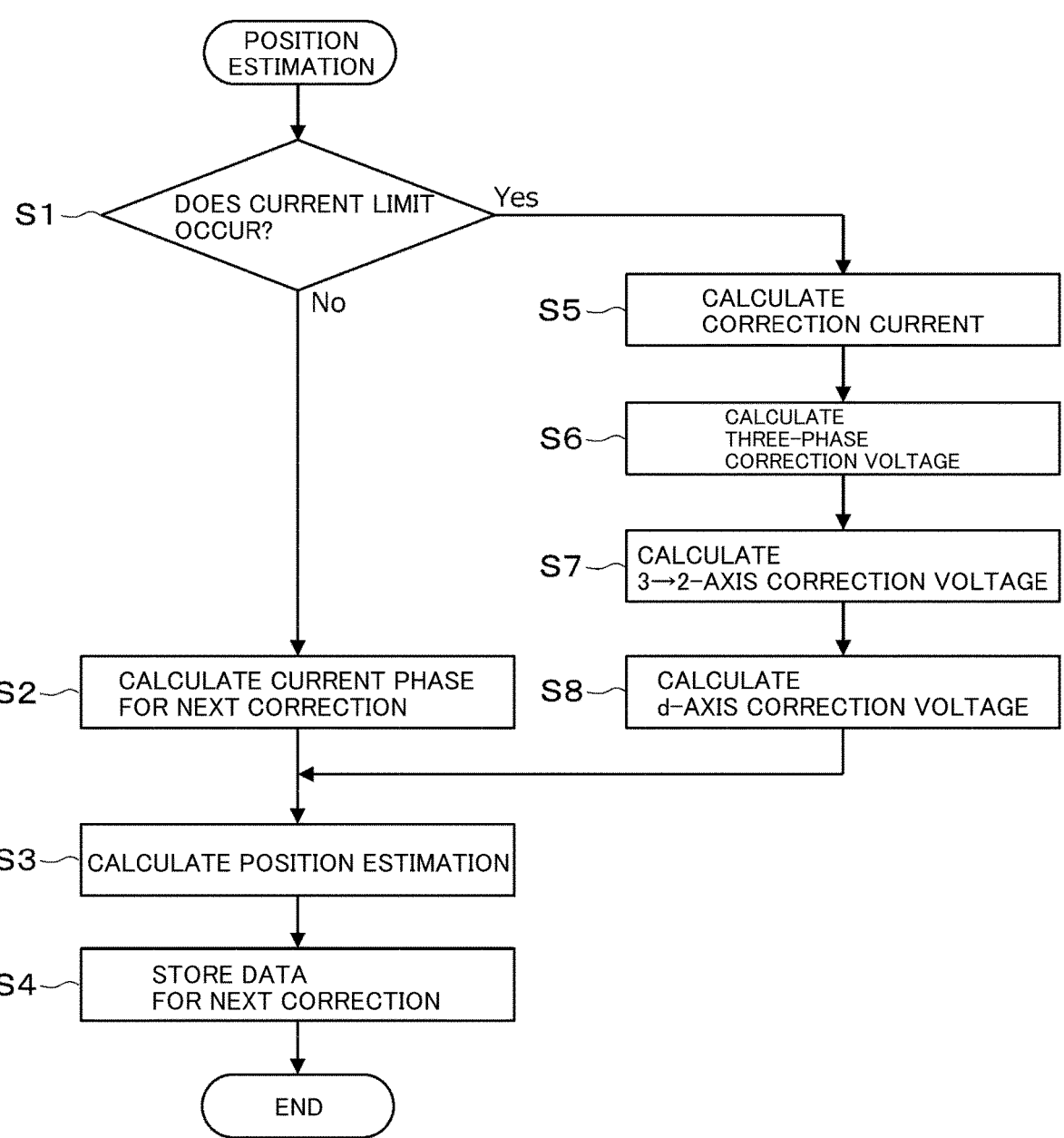
FIG. 11 is a flowchart showing a position estimation process.

FIG. 11 is a flowchart showing a position estimation process. When the current limit has not occurred (S1; N), when the current limit occurs next time, the current phase to be used for correction is calculated from Formula (8) (S2). When the current limit occurs (S1; Y), a correction current is calculated using Formulas (6) and (7) (S5). Subsequently, a three-phase correction voltage, a 2-axis correction voltage, and the d-axis correction voltage are calculated from Formulas (2) to (5) (S6 to S8).

When step S2 or S8 is executed, the d-axis electromotive voltage Ed is obtained from Formula (1), PI control is performed such that the d-axis electromotive voltage Ed becomes zero, and the speed is obtained from the obtained result and the speed command. In addition, the speed is integrated to obtain an angle, and a position estimation calculation is performed (S3). Then, for the next correction, the d- and q-axis currents, the three-phase duty, and sine and cosine values used in the output coordinate axis transformation are stored in a memory or the like corresponding to a current value storage unit (S4).

Figure 12:
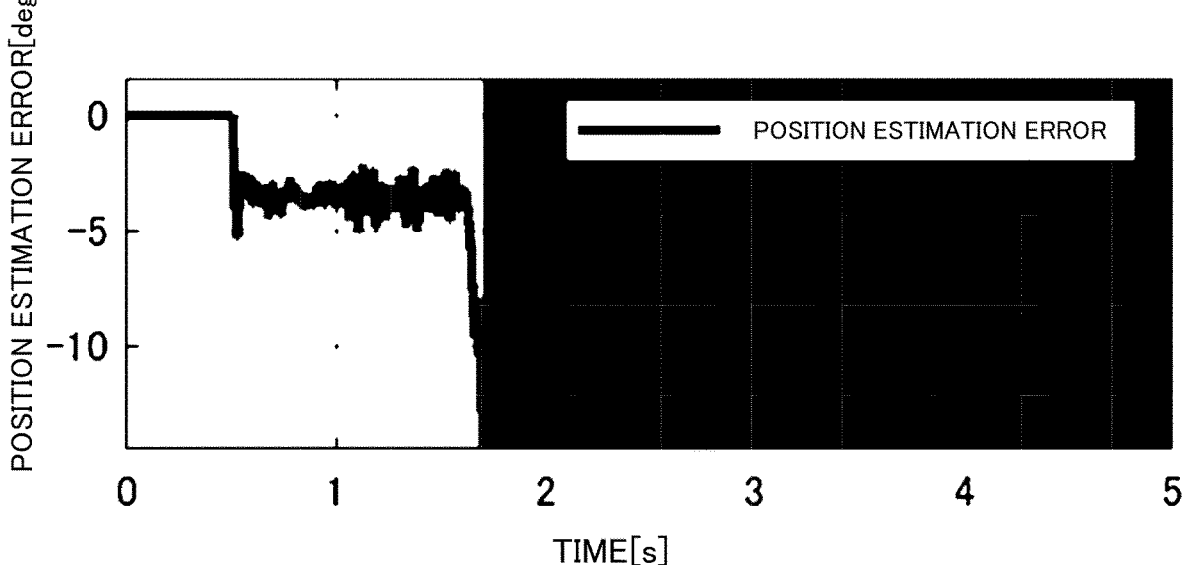
FIG. 12 is a diagram showing a simulation result of position estimation when there is no position estimation correction at the time of current limit occurrence.
Figure 13:
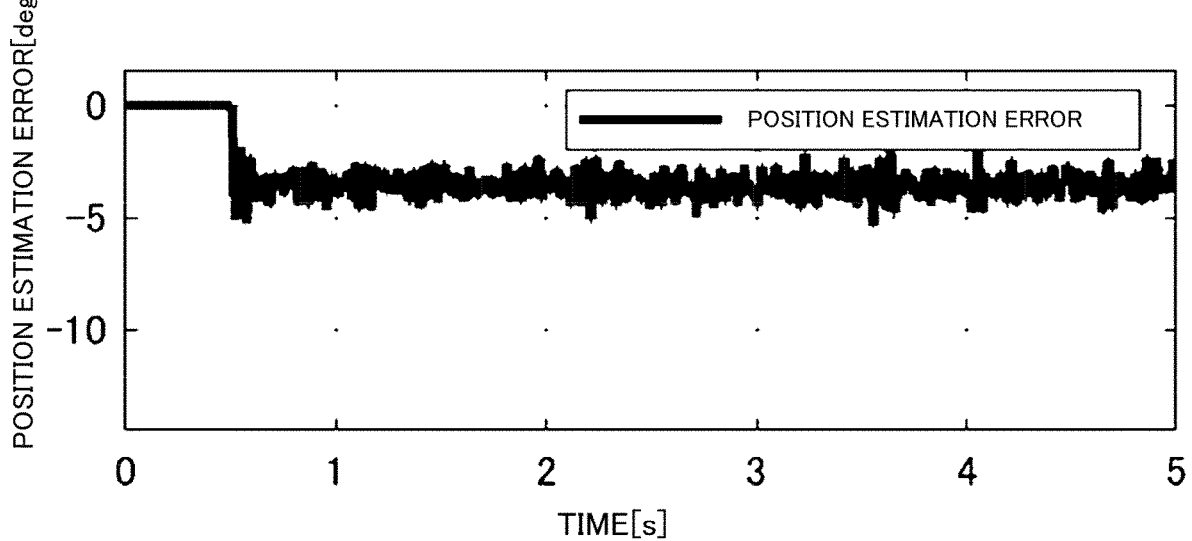
FIG. 13 is a diagram showing a simulation result of position estimation when there is position estimation correction at the time of current limit occurrence.

FIGS. 12 and 13 show simulations results at the time of current limit occurrence. FIG. 12 shows a case where no position estimation correction is executed, and FIG. 13 shows a case where position estimation correction is executed. When no position estimation correction is executed, rotation will stop due to a decrease in position estimation accuracy. When the position estimation correction is executed, driving can be continued while position estimation accuracy is maintained. From the above, it has been confirmed that rotation stoppage of the motor 1 due to step-out can be avoided by executing the position estimation correction at the time of current limit occurrence. Note that the present embodiment is applicable to a motor control microcomputer and a driver IC.

As described above, the motor drive device according to the present embodiment includes: the inverter 2 having the configuration in which the half-bridge circuits 4 for three phases including a series circuit of a pair of positive and negative semiconductor switching elements 5 are connected in parallel to each other and configured to drive the motor 1; the controller 11 configured to generate and output on/off signals for each of the semiconductor switching elements 5 by the PWM control; the resistor element 10 as the current detection unit configured to detect the current flowing through the inverter 2; the current limit unit 13 configured to stop the operation of the controller 11 when the current reaches the threshold; and the position estimation unit 15 configured to estimate the rotational position of the motor 1 using the motor current and the motor voltage. The position estimation unit 15 is configured to correct the motor voltage used for estimation of the rotational position in the carrier cycle of the PWM control in which the operation of the controller 11 is stopped. Thereby, the rotational position of the motor 1 can be estimated with high accuracy even during the period when the current limit occurs.

Further, the current limit unit 13 outputs the trigger signal when the detected current exceeds the threshold, the gate driver 19 retains, as current limit occurrence timing data, the count value OVVDATA within the carrier cycle in the PWM control at the point of time when the trigger signal is output. The position estimation unit 15 corrects the motor voltage using the current limit occurrence timing data. The current limit occurrence timing data is output from the gate driver 19 at the timing synchronized with the carrier cycle, that is, in the cycle next to the carrier cycle in which the trigger signal is output. Therefore, the position estimation unit 15 can grasp that the current limit occurs at any timing within the carrier cycle.

Further, the position estimation unit 15 compares one or both of a start count value START at a point of time when the output of each phase PWM signal starts and an end count value END at a point of time when the output ends with the data OVVDATA to determine the correction value of the motor voltage. In other words, the correction value can be determined under three conditions classified depending on the output state of each phase gate signal and the timing at which the trigger signal is output.

The position estimation unit 15 divides a difference between the data OVVDATA and the count value START by a duty ratio, which is scheduled to be output in the cycle, to determine the correction value when the data OVVDATA is larger than the start count value START and is smaller than the end count value END. Thereby, even in the case of Condition (2) in which the trigger signal is output while the gate signal is being output, the correction value can be determined appropriately.

In addition, the resistor element 10 as the current detection unit is the single-shunt resistor arranged in the DC power supply unit, and the position estimation unit 15 uses the current value stored in the carrier cycle before the operation of the controller 11 stops or the current command value to estimate the rotational position.

Therefore, even when there is a period in which no current can be detected using the single-shunt current detection system, the rotational position can be estimated with high accuracy.

Other Embodiments

The current detection system is not limited to the single-shunt system, and may be a three-shunt system. In this case, it is not necessary to use the stored current value or current command value to estimate the rotational position.

The PWM signal does not necessarily have to be generated bidirectionally from the center phase of the carrier cycle.

The semiconductor switching element is not limited to an N-channel MOSFET.

While certain embodiments of the inventions have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

We claim:

1. A motor drive device comprising:
   a power conversion circuit having a configuration in which a plurality of arms including a series circuit of positive and negative semiconductor switching elements are connected in parallel to each other and configured to drive a motor;
   a controller configured to generate and output on/off signals for each of the semiconductor switching elements constituting the power conversion circuit by PWM control;
   a current detection unit configured to detect a current flowing through the power conversion circuit;
   a current limit unit configured to stop an operation of the controller when the current reaches a threshold; and
   a position estimation unit configured to estimate a rotational position of the motor using a motor current and a motor voltage,
   the position estimation unit being configured to correct the motor voltage used for estimation of the rotational position in a carrier cycle of the PWM control in which the operation of the controller is stopped.

2. The motor drive device according to claim 1, wherein the current limit unit outputs a trigger signal when the current exceeds the threshold, the motor drive device further includes a data retaining unit configured to retain, as current limit occurrence timing data, a count value within the carrier cycle in the PWM control at a point of time when the trigger signal is output, and the position estimation unit corrects the motor voltage using the current limit occurrence timing data.

3. The motor drive device according to claim 2, wherein the current limit occurrence timing data is output from the data retaining unit at a timing synchronized with the carrier cycle.

4. The motor drive device according to claim 3, wherein the current limit occurrence timing data is output from the data retaining unit in a cycle next to the carrier cycle in which the trigger signal is output.

5. The motor drive device according to claim 4, wherein the position estimation unit compares one or both of a start count value at a point of time when an output of each phase PWM signal starts and an end count value at a point of time when the output ends with the current limit occurrence timing data to determine a correction value of the motor voltage.

6. The motor drive device according to claim 5, wherein the position estimation unit divides a difference between the current limit occurrence timing data and the start count value by a duty ratio, which is scheduled to be output in the cycle, to determine the correction value when the current limit occurrence timing data is larger than the start count value and is smaller than the end count value.

7. The motor drive device according to claim 1, wherein the current detection unit is a single-shunt resistor arranged in a DC power supply line, the motor drive device further includes a current value storage unit that stores a current value detected by the current detection unit, and the position estimation unit uses a current value stored in a carrier cycle before the operation of the controller stops to estimate the rotational position.

8. The motor drive device according to claim 1, wherein the current detection unit is a single-shunt resistor arranged in a DC power supply line, the motor drive device further includes:

a current command value determination unit that is used for current control and determines a current command value according to a speed command input from the outside; and a command value storage unit that stores the current command value, and the position estimation unit uses a current command value stored in a carrier cycle before the operation of the controller stops to estimate the rotational position.

9. A motor driving method performing, when a motor is driven by a power conversion circuit having a configuration in which a plurality of arms including a series circuit of positive and negative semiconductor switching elements are connected in parallel to each other, processes of:

generating and outputting on/off signals for each of the semiconductor switching elements constituting the power conversion circuit by PWM control;

detecting a current flowing through the power conversion circuit;

stopping the output of the on/off signals when the current reaches a threshold;

estimating a rotational position of the motor using a motor current and a motor voltage; and correcting the motor voltage used for estimation of the rotational position in a carrier cycle of the PWM control in which the output of the on/off signals is stopped.

\* \* \* \* \*